(12) United States Patent
Gott

(10) Patent No.: US 6,231,266 B1
(45) Date of Patent: May 15, 2001

(54) CAM LOCK FASTENING SYSTEM

(76) Inventor: John P. Gott, 342 Twin Lakes Dr., Halifax, MA (US) 02338

(*) Notice: Subject to any disclaimer, the term of this patent is extended or adjusted under 35 U.S.C. 154(b) by 0 days.

(21) Appl. No.: 09/197,407

(22) Filed: Nov. 20, 1998

Related U.S. Application Data
(60) Provisional application No. 60/066,335, filed on Nov. 21, 1997.

(51) Int. Cl.$^7$ .................................................... F16B 2/18
(52) U.S. Cl. ................................ 403/338; 409/DIG. 10; 52/127.11; 52/79.5
(58) Field of Search .................................. 403/338, 321, 403/322.4, 374.1, 374.5, 409.1, DIG. 10; 52/582.1, 582.2, 584.1, 79.5, 127.11; 34/270; 454/50, 55; 292/34, 46; 24/498, 134 R

(56) References Cited

U.S. PATENT DOCUMENTS

| | | | |
|---|---|---|---|
| 805,675 | * 11/1905 | Shive | ............................ 24/134 R X |
| 2,080,700 | * 5/1937 | Dale | ................................... 24/134 R |
| 2,556,491 | * 6/1951 | De Lorenzo | ........................ 24/498 X |
| 3,453,925 | 7/1969 | Peterson . | |
| 3,900,931 | 8/1975 | Lavoillote . | |
| 4,145,862 | 3/1979 | Sygnator . | |
| 4,693,629 | 9/1987 | Bruinsma . | |
| 4,881,349 | * 11/1989 | Brown et al. | .................... 52/584.1 X |
| 5,011,355 | 4/1991 | Motoshige . | |
| 5,011,356 | 4/1991 | Fernandez . | |
| 5,015,117 | * 5/1991 | Pawlicki | ........................ 403/374.5 X |
| 5,302,039 | 4/1994 | Omholt . | |
| 5,488,808 | * 2/1996 | Cahill et al. | .................... 52/127.11 X |

* cited by examiner

*Primary Examiner*—Harry C. Kim
(74) *Attorney, Agent, or Firm*—D. Michael Burns

(57) ABSTRACT

A cam lock fastening system including cam lock devices for connecting two or more sheet metal panels to create a work booth. The device comprises a rigid, pivotable handle which includes at one end a cam like head; the handle being attached to an angle iron by a pivot pin. The angle iron is placed over the edges of the panels and is in a cooperating relationship with the panels as the handle is pivoted, causing the cam surface to be compressed against the compacted panel. The device is closed completely when a flat portion of the cam surface is in a locking relationship with the panels. The locking of the device is aided by exerting influence upon the handle in a biasing manner, such as with a mallet like tool. The panels may be disconnected by reversing the direction of the handle to unlock the device. Eight foot sheet metal panels would require about three devices.

16 Claims, 4 Drawing Sheets

CAM LOCK FASTENING SYSTEM

CROSS REFERENCE TO RELATED APPLICATION

This application is based on Provisional Patent Application Ser. No. 60/066,335, filed Nov. 21, 1997.

BACKGROUND OF THE INVENTION

1. Field of the Invention

The present invention relates to a cam lock device and fastening system that can be used to connect at least two sheet metal panels, the panels having an improved flange construction, preferably in the assembling of paint spraying booths.

2. Description of the Prior Art

In the sheet metal industry, sheet metal panels can be connected by a variety of methods. But, primarily the method for assembling paint spraying booths has been to use nuts and bolts, which can often mean a very unsatisfactory use of man power. This method, in addition to being not very cost effective, requires that holes be made in the sheet metal panels and this is often not acceptable. In most body shops, automobile service departments and car painting businesses, the paint spraying booths are set-up and torn down on a regular basis. The speed in which this is done is very important, as is the necessity that they be tight enough to seal in the dust and paint vapors. The holes made in the panels for the nuts/bolts is a source of future problems. Also, the introduction of holes into the panels will further require that the panels have perfect alignment, whenever and wherever they are assembled. In the preferred embodiment, that being where the cam lock of the present invention is used to connect together sheet metal panels, the major industrial application is in paint spraying booths. These booths will be found in virtually every automobile dealer service department, auto body shop, automobile paint shop etc.. The prior art has previously addressed the long-felt need for combining together metal panels by less labor intensive methods than nuts and bolts.

U.S. Pat. No. 3,900,931 issued to Lavoillote on Aug. 26, 1975, discloses a releasable panel fastening device. This invention utilizes a key to lock the plates together. In order for the plates to be locked there must be slots in them or else the device will not work. A key is inserted and by turning it the connection will either be tightened or released. Although some labor is saved, this invention would be more suitable to an application which does not require tight sealing such as required with a paint spraying booth.

Athough Peterson does not teach using his pivotal locking device, which is disclosed in U.S. Pat. No. 3,453,925 issued on Jan. 12, 1968, to connect sheet metal panels for paint spraying booths, he does teach of a device that uses a locking lever and which engages a cam bearing plate element. Again, holes are necessary to be made in the material and the invention does entail numerous parts which tend to make it less cost effective.

U.S. Pat. No. 4,145,862 issued to Henry A. Sygnator on Mar. 27, 1979, describes a sheet metal fastening device for securing two work panels together. Again, no reference is made for possible use in paint spraying booths, however a labor saving method is disclosed. In operation, the retainer plates are preferably pre-assembled so that the fastener of the invention can be aligned within an aperture of one of the plates. The plates are then clamped tight when aligned elongated apertures of one of the panels are assembled over the locking region. However, this invention does not teach a method of securing the that would avoid using holes or slots.

U.S. Pat. No. 5,011,356 issued to Miguel C. Fernandez on Apr. 30, 1991, discloses a method of fastening a plurality of overlapped panels. He utilizes a pair of diametrically opposed inclined cam portions. The panels, upon completion of a 90 degree rotation, are disposed in a compressed state. Again this invention requires holes or slots in order for the panels to be attached. This would make it very ineffective for use with paint spraying booths.

U.S. Pat. No. 5,011,355 issued to Inaba Motoshige on Apr. 30, 1991, teaches of a push button type fastener which is releasable by rotation. The fastener requires a stud assembly to be snap-fitted to one panel while a mating socket is similarly fitted to another panel. The stud assembly and the socket are releasably secured to each other merely by the pushing of a stud toward the mating socket, whereby two resilient arms move apart to receive and lock the device. Once again, this device requires apertures in the sheet metal and while it appears to be an improvement over the prior art, it does not appear to overcome the basic problem, which is to avoid having holes in the panels.

U.S. Pat. No. 5,302,039 issued to Bruce Omholt on Apr. 12, 1994, teaches a panel coupler that does not require any holes to the panels to be coupled. The coupler will releasably and adjustably hold two or more panel clamps for coupling together two or more adjoining panels. The outstanding feature of this invention is that more than two panels can be connected by any one coupler device. It does overcome some of the prior art shortcomings, such as holes in the panels, fixed width panel receiving channels which offer very little versatility, and of course heavy, cumbersome devices. This invention can accommodate, without any modifications, three or more panels, and panels of varying thicknesses. The invention can be lightweight, even plastic. The major problem area of the invention is that when the panels are attached, a tight fit between the panels is not possible. Thus, this invention would have difficulty being utilized in an application that involved a paint spraying booth.

U.S. Pat. No. 4,693,629 issued to Robert F. Bruinsma on Sep. 15, 1987, shows a fastener that joins a plurality of panel members together at their corners and will provide a tight, aligned joint between panels. The device can be easily and very quickly disconnected to facilitate the movement of the panels from one place to another. Here, the panels do need to have notches formed within them, such that a part of the device extends into the notches and abuts them in a clamping arrangement as found in much of the prior art. This fastener addresses the long felt need for a fastener which is separate from the panel structure itself, is relative easy to install or replace, requires no special aligning devices, and finally can join several panels. However, it can only connect panels at their corners and therefore is not very functional for use in a paint spraying booth.

The present invention overcomes the foregoing disadvantages of prior panel locking devices by providing a cam lock that can easily be used to couple two or more sheet metal panels yet still be able to accommodate panels of different thicknesses. None of the prior art is seen to be as simple in construction nor as easy to operate as the present invention. The present invention does not require any holes, slots, notches or apertures of any kind in the sheet metal panel in order for it to operate.

None of the above noted patents, taken either singly or in combination, are seen to disclose the specific arrangement of concepts disclosed by the present invention.

SUMMARY OF THE INVENTION

The cam lock device, of the present invention, is a rather small, simple tool that comprises actually only three parts. These parts include a handle, an angle iron with an integral pivot pin that serves to connect the handle to the angle iron and also allows for the handle to have a fixed rotation about an axis. The operation of the cam lock is to tighten two or more sheet metal panels in a manner that will not require holes, slots or apertures of any kind in the panel material. These sheet metal panels have specially designed and improved flanges which cooperate with the cam lock to form the fastening system of the present invention. The angle iron member cooperates with at least two edges of the sheet material in such a way that when the panels are nested together, the angle iron braces the panels against the compression delivered by the rotating handle. The rotating handle has a rounded head at one end which comprises first, a beveled leading edge, then a cam shaped surface, and finally a flat surface. When the handle is pivoted by the operator, the bevel surface eases the rounded end into an engaging position with the panels, then the cam shaped surface is compressed into the panels with an extremely biasing motion. At some point, after the handle has been put into motion, it may be helpful to use an implement such as a mallet to bias the rounded end towards a locking position, which happens when the flat surface of the rounded head portion is completely engaged with the sheet metal surface. The procedure can be reversed by merely striking the handle in the opposite direction with the same mallet like tool. This entire operation of connecting two or more panels can be done in two to five seconds. With about one cam lock device at approximately every 18 inches, the installation of a paint spraying booth can be done in a fraction of the time it takes with conventional nuts and bolts.

Accordingly, it is a principal object of the invention to provide an effective grip locking tool that can be used in the quick assembly and disassembly of sheet metal panels, such as those used in paint spraying booths.

It is another object of the invention to provide an improved means for providing a completely sealed booth, one that is without holes for such things as nuts, bolts or rivets.

It is still another object of the invention to provide a state of the art tool that is easy to use, contains a minimum number of parts, is inexpensive and fully effective in accomplishing its intended purposes.

It is an object of this invention to provide a system, utilizing the tool of the present invention in concert with a crimping technique upon the edges of the metal panels, that will be usable in putting together a variety of work booths. This present invention teaches a whole new approach towards the assembling of sheet metal panels.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
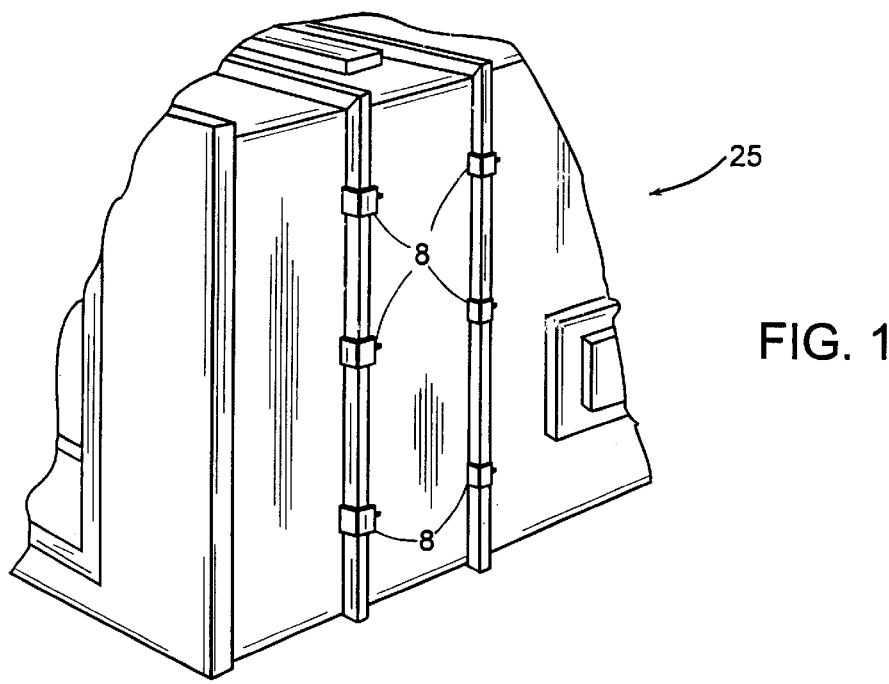
FIG. 1 is an environmental view of a plurality of cam locks which grip panels having improved flange construction to erect an otherwise conventional sheet metal booth.
Figure 2:
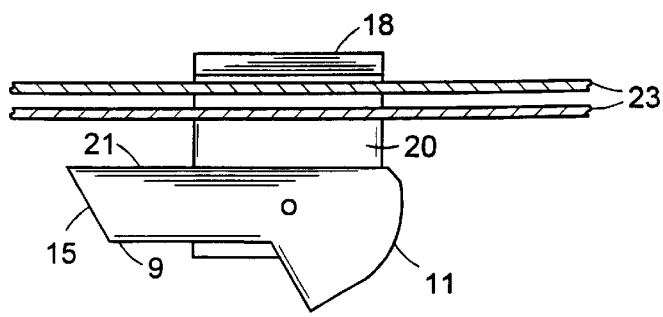
FIG. 2 is a bottom view of the cam lock tool when in the open position.
Figure 5:
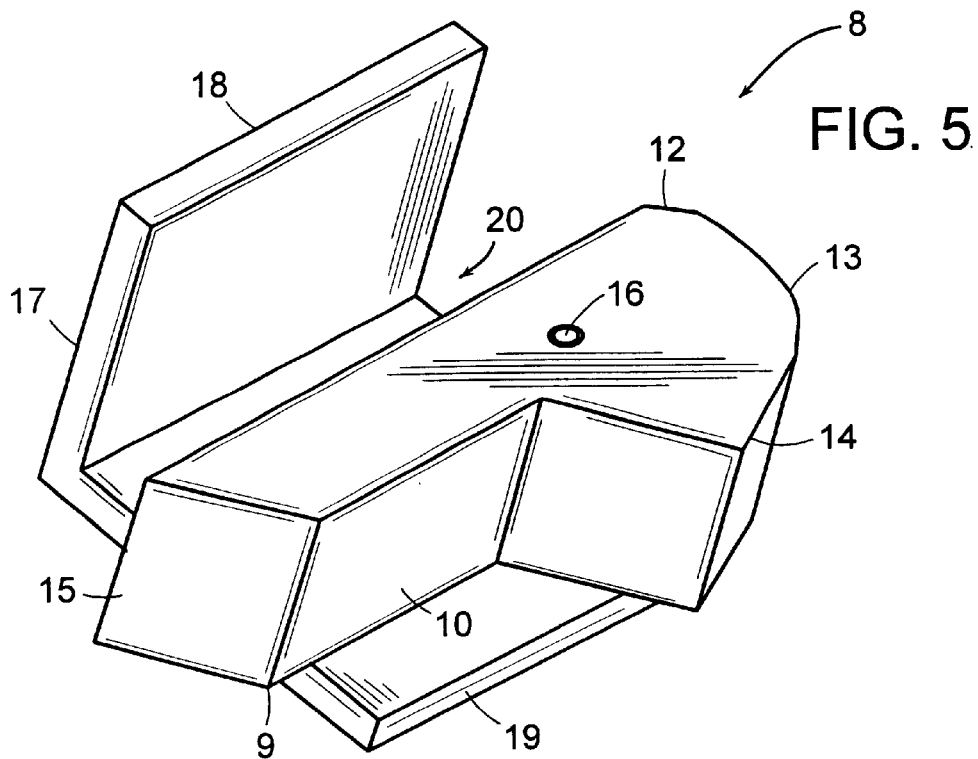
FIG. 5 is a perspective view showing the bottom of the cam lock in the open position.
Figure 6:
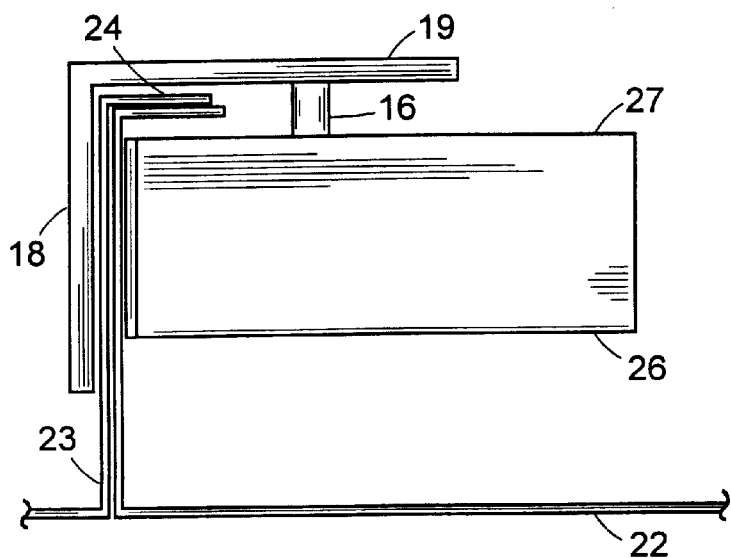
FIG. 6 is a top view of the cam lock completely in the compressed position and showing the relationship between the handle, angle iron and offset pivot pin connecting them.

Referring to the drawings by numerals of reference, and first to FIGS. 1 and 6 which show the present invention in the preferred embodiment, that being a cam lock fastening system 25, comprised of a plurality of cam lock devices 8 fastening together the flange members 23 of the panels 22. The cam locks 8 are spaced at about 18 to 24 inch increments. A typical booth is shown for illustrative purposes only. The types and kinds of booths would comprise a wide spectrum; from spray paint booths to welding booths. Typically the sheet metal panels are about eight feet in height. FIGS. 2 and 5 denote generally the cam lock device 8 in the open position. The cam lock device 8 includes an elongated handle member 9 which is maintained in a rotational fixed spacial relationship with an angle iron 17. The handle member 9 has on one side an elongated gripping portion 10 integral with a slanted surface 15 on its distal end. This slanted surface 15 is approximately 60° when measured from the longitudinal axis. On the other side of the handle 9 is a rounded head 11. This rounded head 11 has a leading edge 12 which is beveled, followed by a cam shaped surface 13 and then a relatively flat surface 14 which is about 0.5 inches long. This rounded end 11 rotates on a 0.9375 inch radius from the center axis of a pivot pin 16. FIG. 6 shows the pivot pin 16 extending from the angle iron 17 and rotatively connecting the handle to the angle iron 17. The pivot is about 0.25 inches in diameter. The handle member 9 also includes a substantially rectangularly longitudinal surface 21 extending approximately 2.75 inches in length. The material of construction for the handle 9 preferably is metal, however nylon type plastic could also be used. The angle iron member 17 is L-shaped and includes two rectangularly shaped sides; a lateral support arm 18 and a top arm 19. The lateral support arm 18 is in a spacial relationship to the handle 9 in such a way that the support arm 18 is face to face and about 0.625 inches from the longitudinally rectangular surface 21 of the handle 9. This is when the device 8 is in the open position. The axis of the pivot pin 16 extends through the handle 9, to rotatably connect the handle 9 and has an end rigidly connected to the top arm 19 of the angle iron 17. The rectangular surface 21 of the handle 9, the support arm 18 and the top arm 19 of the angle iron 17 define a channel 20 therein, this channel 20 accepts at least two sheet metal panels 22 which are fastened by the cam lock device 8.

Figure 3:
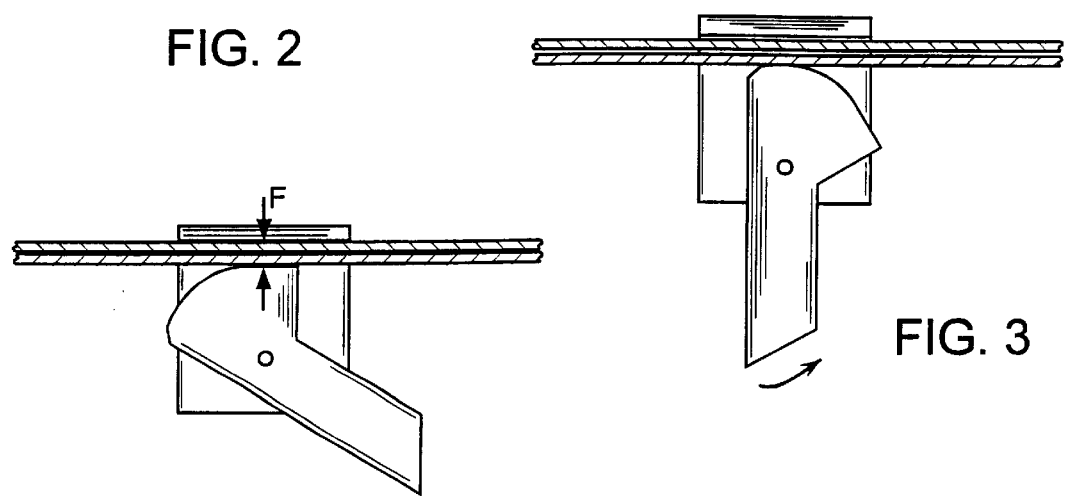
FIG. 3 is another bottom view of the tool when the handle is approximately half closed.
Figure 4:
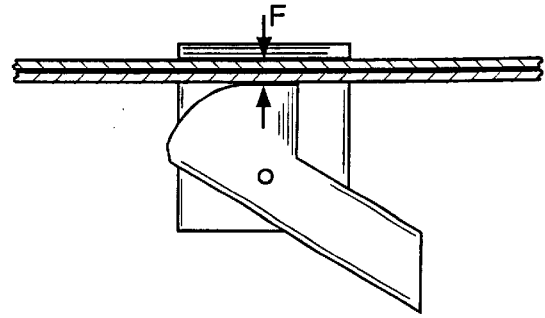
FIG. 4 is still another bottom view showing the tool in the completely locked position, having compressed two sheets of panel together.

Referring now to FIG. 3, the cam lock device 8 is shown about halfway through the locking phase. The leading edge 12, the edge that is beveled for ease of operation, has already made the initial contact with the closest sheet metal panel 22 and the cam shaped surface 13 has engaged the adjacent panel 22, whereby an operator can exert a compressing force upon the panels 22 which are now juxtaposed together. The locking closure of the panels 22 is shown in FIG. 4, whereby the 0.5 inch flat portion 14 of the rounded end 11 is integral with the surface of the closest panel 22. To accomplish this step it is recommended that the distal end, of the longitudinal surface 21 of the handle 9, be biased towards the locking position. To do this a mallet like tool is suggested. To reverse the procedure it is recommended that the handle 9 be similarly exerted along the slanted end 15. The entire procedure, from slipping the device 8 over the panels 22 to the complete locking of the panels 22 can be accomplished in less than three seconds. FIG. 5 is a bottom view of the device 8 in the open position. The height of the device 8 is approximately 1 inch. The width of the gripping portion 10 of the handle 9 is 0.625 inches.

FIG. 6 shows the present invention when in a fully locked position. The handle member 9 has a bottom surface 26 and a top surface 27. The handle 9 is in a pivotal spacial relationship with the top arm 19 of the angle iron 17. The sheet metal panels 22 have flanges 23 which extend perpendicularly away from the panels. The panels 22 are in an end to end relationship to each other, as are the adjacent lip portions 24. Each flange 23 is approximately two inches in length and has a lip portion 24 which has been bent at the distal end of the flange 23 and measures about 0.5 inches. The locking process requires the lip portion 24 to be deposed in the channel 20 prior to their being locked by the device 8. This lip portion 24 is critical to the present invention as it allows the operator to quickly put the angle iron 17 over the flange 23 and thereby be in the proper position and alignment for the locking of the device 8.

Figure 7:
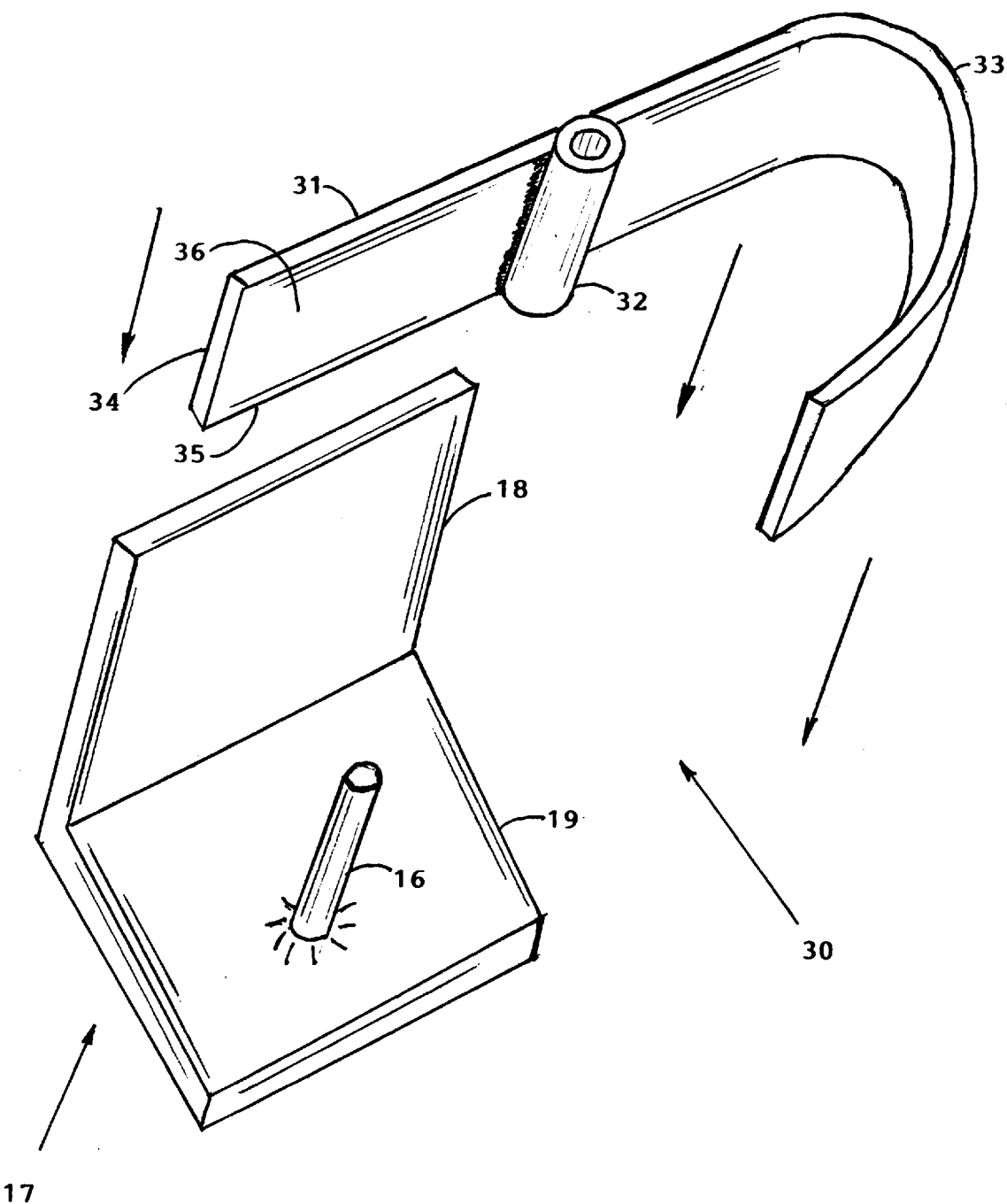
FIG. 7 is a perspective view of another embodiment of the angle iron, handle and pivot pin arrangement.
Figure 8:
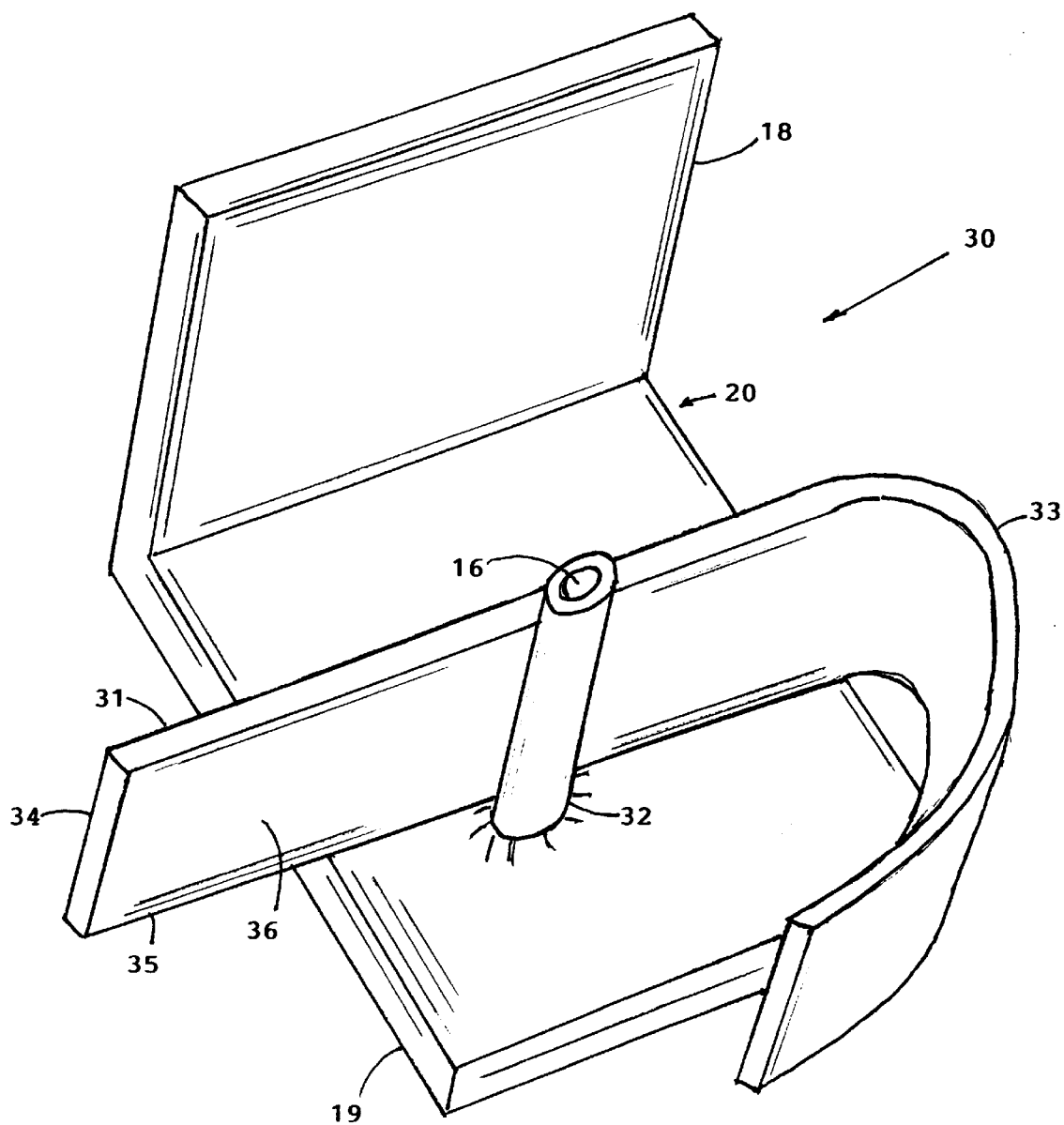
FIG. 8 is a perspective view of the alternate embodiment in the open position.

FIGS. 7 and 8 depict an alternative embodiment 30 of the lock device 8 of the present invention. Although the principle of operation remains identical to the preferred embodiment 8, this embodiment teaches of a less expensive cam lock device 30. The handle 34 has a gripping portion 35 on one end which is integral with a rounded cam like head portion 33 on the other end. The cam head portion 33 is formed simply by bending a piece of flat iron stock, approximately 1.5 inches by 0.1875 inches. The handle 34 has two longitudinally rectangular surfaces, one surface 31 in a face to face relationship with the lateral surface 18 of the angle iron. To compensate for variations in the thicknesses of panel material, the radius of the head 33 may be increased, as the radius of the cam is increased so will the pressure exerted upon the panels 22.

The main difference between the two embodiments is that in the alternate embodiment 30, the handle 34 has a hollow sleeve 32 integrally attached to the other longitudinally rectangular surface 36, whereas in the preferred embodiment 8 there is a hole in the midsection of the handle 9. In both embodiments 8 and 30, the pivot pin 16 remains fixedly attached to the top arm 19 of the angle iron 17 and the handles 9 or 34 are pivotally connected thereof. It is to be understood that when the alternate embodiment 30 is slipped over the pivot pin 16, means of securing it in place such as a bolt head can be used.

The present invention is seen to cut the overall installation time required to assemble or disassemble a painting spray booth by at least 80 percent. It is to be understood that the present invention is not limited to the sole embodiment described above, but encompasses any and all embodiments within the scope of this following claims.

What is claimed is:

1. A cam lock device for fastening sheet metal panels, the device comprising:

an elongate handle member including:

a gripping portion, a hollow sleeve welded to one side of the handle member, and a generally rounded head in the shape of a cam;

an L-shaped angle iron member; and a pivot pin extending through and rotatively connecting the hollow sleeve of the handle member to the angle iron member in a spacial relationship defining a channel when the handle member is in an open position, whereby with at least two of the panels disposed within the channel, the rounded head of the handle member may be biased against the panels to fasten them together.

2. The device according to claim 1, wherein the L-shaped angle iron member comprises:

a pair of generally rectangular arms defined by a lateral support arm integral along one edge and in a perpendicular relationship with one of the edges of a top arm;

the lateral support arm being in a face to face relationship with the handle member when the handle member is in said open position thereby defining the channel; and the top arm having the pivot pin perpendicularly fixedly mounted to it, such that the handle member can be rotated about the pin to lock the sheet metal panels together.

3. A system for fastening sheet metal panels, the system comprising:

a plurality of cam lock devices, each device having an elongate handle member, an L shaped angle iron member, and a pivot pin rotationally connecting the angle iron member to the handle member in a pivotable spacial relationship such that the handle member and angle iron member define between their surfaces a channel; and a plurality of panels, each panel having a flange member extending perpendicularly outward from the panel surface, each flange member having a distal end, a lip portion bent at the distal end such that the lip portion is generally perpendicular to the flange member, whereby a pair of the panels being in an end to end position relative to each other, the flange members in a face to face relationship as are the lip portions which are nested together within the channel, the plurality of cam lock devices can be used to fasten the panels by merely pivoting the handle member with some force in a counter clockwise direction.

4. The system according to claim 3, wherein the handle member includes:

a gripping portion;

the handle member having defined a hole therein for slidable rotating connection with the pivot pin; and a rounded head integral with the other end of the gripping portion, the rounded head including a beveled leading edge for the initial engagement with the panel surface, a cam shaped surface to allow the handle member to be urgently biased against the panel and a flat surface which is in a face to face relationship with the juxtaposed panels when the device is in a locked position.

5. The system according to claim 4, wherein:

the handle member includes a longitudinally rectangular surface;

the L-shaped angle iron member includes a pair of rectangularly perpendicular arms defined by a lateral support arm integral along one edge and in a perpendicular relationship with one of the edges of a top arm;

the lateral support arm being in a face to face relationship with the longitudinal rectangular surface of the handle member when the handle member is in an open position thus defining the channel; and the top arm having the pivot pin perpendicularly fixedly attached whereby the handle member can be rotated about the axis of the pin when being biased against the flanges thereby clamping the sheet metal panels together.

6. The system according to claim 5, wherein the flange members are fastened together by the cam lock devices at 18 to 24 inch interval, thus a work booth can be erected without any perforations in the sheet metal panels thereof.

7. The system according to claim 6, wherein the work booth is a paint spraying booth.

8. The system according to claim 3, wherein the handle member includes;

a gripping portion:

a hollow sleeve welded to one side of the handle member for pivotally engaging the pivot pin; and a generally rounded head in the shape of a cam which upon being rotated will bias the panels so that they will be compressed into a locked position.

9. The system according to claim 8, wherein the L-shaped angle iron member comprises:

a pair of generally rectangular arms defined by a lateral support arm integral along one edge and in a perpendicular relationship with one of the edges of a top arm;

the lateral support arm being in a face to face relationship with the handle member when the handle member is in an open position thereby defining the channel; and a top arm having the pivot pin perpendicularly fixedly mounted to it, such that the handle member can be rotated about the pin to lock the sheet metal panels together.

10. The system according to claim 9, wherein the flange members are fastened together by the cam lock devices at 18 to 24 inch intervals, thus a work booth can be erected without any perforations in the sheet metal panels thereof.

11. The system according to claim 10, wherein the booth is a paint spraying booth.

12. A work booth comprising:

a plurality of sheet metal panels;

the panels having flanges extending perpendicularly outward from the panels;

the flanges having a distal end bent to form a lip portion;

a plurality of cam lock devices each having a channel defined therein by a pivotable handle member and an L-shaped angle iron member, the lip portions of the flanges disposed within the channels so as to provide alignment for the handle member as it is pivoted with extreme bias against the flanges thus releasably locking the panels together; and with the devices spaced at intervals of approximately 18 to 24 inches along the flanges, the work booth can be erected according to conventional building methods but without any perforations in the sheet metal panels thereof.

13. The work booth according to claim 12, wherein each cam lock device comprises:

the pivotable handle member having a gripping portion, on one side of the gripping portion slanted surface, on the other side a generally rounded head, the rounded head having three surfaces, first a leading edge surface for initial engagement with the flanges, secondly a cam shaped surface for biasing the head against the flanges and thirdly a flat surface for locking the head with the flanges;

the handle member having a flat longitudinally rectangular surface; the L-shaped angle iron member having a pair of rectangularly perpendicular arms defined by a lateral support arm integral along one edge with one of the edges of a top arm, the lateral support arm in a face to face relationship with one of the longitudinally rectangular surface of the handle member such that the channel is defined therein; and a pivot pin being fixedly attached at one end to the top arm of the angle iron member and the other end passing through and forming an axis for the handle member to rotate about, whereby the handle member can be urgently biased about the axis to compress the flanges in a locked position and whereby the procedure can be reversed by tapping the slanted surface of the handle member with a hammer like tool.

14. The work booth according to claim 13, wherein the booth is a paint spraying booth.

15. The work booth according to claim 12, wherein each cam lock device comprises:

the pivotable handle member having at one end a gripping portion, a cam shaped head portion at the other end, the cam head portion for biasing a rotating handle member against the sheet metal panel flanges;

the handle member having two longitudinally rectangular surfaces;

a hollow sleeve welded to one of the surfaces;

the L-shaped angle iron member having a pair of rectangularly perpendicular arms defined by a lateral support arm integral along one edge with one of the edges of a top arm, the lateral support arm in a face to face relationship with the other surface of the handle member such that when the handle member is in the open position the channel is defined therein; and a pivot pin having one end fixedly attached to the top arm of the angle iron member, and the other end in an engaging relationship with the hollow sleeve so that the handle member can rotate about the axis of the pivot pin, whereby the handle member can be urgently biased about the axis to compress the flanges in a locked position and whereby the procedure can be reversed by by reversing the rotation of the handle member.

16. The work booth according to claim 15, wherein the work booth is a paint spraying booth.

* * * * *